United States Patent

Karanian et al.

[11] 3,976,088
[45] Aug. 24, 1976

[54] DUAL SIDE-MOUNTED INLET-VEHICLE ORIENTATION

[75] Inventors: Arthur J. Karanian, Wethersfield; Robert L. O'Brien, Glastonbury, both of Conn.

[73] Assignee: The United States of America as represented by the Secretary of the Navy, Washington, D.C.

[22] Filed: July 26, 1974

[21] Appl. No.: 492,073

[52] U.S. Cl. .............................. 137/15.1; 60/270 R
[51] Int. Cl.² ........................................ H01M 4/20
[58] Field of Search ............ 137/15.1, 15.2; 60/270

[56] References Cited
UNITED STATES PATENTS

| | | | |
|---|---|---|---|
| 3,062,484 | 11/1962 | Himka | 60/270 |
| 3,514,957 | 6/1970 | Evans | 137/15.2 |
| 3,717,163 | 2/1973 | Herr | 137/15.1 |

Primary Examiner—Samuel Feinberg
Attorney, Agent, or Firm—R. S. Sciascia; Q. E. Hodges; D. McGiehan

[57] ABSTRACT

A dual, side-mounted inlet for air-launched ramjet missiles that require high angle-of-attack capability. The inlets are located symetrically on both sides of the vehicle pitch plane at an optimum angular displacement around the vehicle's lower surface from windward side meridian, lying in the pitch plane. The inlet pressure recovery and relative weight flow reach maximum values at angular displacements between 45° and 60° at positive angles of attack. The inlet is attached to the vehicle with a conventional boundary layer diverter of minimum height.

3 Claims, 3 Drawing Figures

DUAL SIDE-MOUNTED INLET-VEHICLE ORIENTATION

The invention described herein may be manufactured and used by or for the Government of the United States of America for governmental purposes without the payment of any royalties thereon or therefor.

BACKGROUND OF THE INVENTION

The instant invention relates generally to missile propulsion and more particularly to a duel, side-mounted inlet for ramjet missiles.

The use of the ramjet principle of propulsion in missiles, while effective, presents many problems, particularly the placement of the ram air inlet to obtain high velocity ram air at normally expected flight angles of attack. Rather than use rotary vane air compressors as in conventional jet engines, the ram jet depends on its relative motion with the air stream to gather and compress combustion air.

Previous attempts at obtaining sufficient ram air involved the use of a coaxial duct in the nose cone of the missile and aft-mounted inlet systems having four inlets along the side of the missile in an "+" or "×" orientation about circumference. While the orientations of these ram inlets provide sufficient performance for the accomplishment of missions wherein the vehicle is subjected to small angles-of-attack, they cannot provide sufficient performance at the high angles-of-attack associated with the trajectory requirement imposed upon a missile engaging a manuevering target. In addition the nose cone duct orientation produced excess drag compared to the conventional ogive nose cone.

In the conventional side-mounted "+" and "×" orientation, there are four orthogonally opposed inlets about the circumference of the vehicle. These orientations are in reference to the pitch plane and presume that the missile is stabilized in roll. In the aft-mounted inlet systems, both inlet orientation and circumferential location on the vehicle affect the ramjet's angle-of-attack performance, with the "+" configuration providing somewhat superior inlet performance to the "×" configuration.

The problems encountered with the aft mounted conventional orientations is that the angle-of-attack flow spillage characteristics have an important effect on the ramjet engine performance.

Recent studies of the use of air-breathing (ramjet) propulsion in practical missile applications have indicated substantial performance advantages which permit missions beyond the capability of rocket-powered propulsion systems. A primary problem area in the application of these fixed-geometry, air-breathing propulsion systems is the need for efficient ramjet operation over an extended range of flight conditions, i.e., mach number, angle-of-attack and altitude. This extended range of operation is required so that varied mission profiles and a large portion of the boost acceleration may be effectively flown with the air-breathing propulsion mode. It would be highly desirable to provide capabilities for operation at high angles-of-attack without requiring reduced fuel flow during manuevers so that full propulsion system thrust can be maintained. It is desirable to solve these problems without added engine and inlet complexity, such as variable-geometry components. A dual, side-mounted inlet configuration has been found to solve these problems and is the subject of the instant invention.

SUMMARY OF THE INVENTION

Accordingly, an object of the instant invention is to provide a new and improved inlet system for air-launched ramjet missiles.

Another object of the present invention is to provide a ramjet inlet system for missiles that will accept relatively high angles-of-attack without degradation of propulsion performance.

Still another object of the instant invention is to provide a ramjet inlet system having high pressure recovery and relative weight flow at normally expected angles-of-attack.

A further object of the instant inventon is to provide a ramjet inlet system optimizing ramjet performance with minimum drag and without complex variable-geometry components.

A still further object of the instant invention is to provide a feasible air-breathing propulsion system for practical air-launched missiles.

Briefly, these and other objects of the instant invention are attained by the use of dual, side-mounted ramjet air inlet located at the aft end of a missile at a circumferential position from the pitch plane so as to be on the windward side during all normal angles-of-attack. At positions 45 to 60° from the windward side meridian lying in the pitch plane, the inlets will experience low yaw angles and actually increased compression as the angle-of-attack is increased.

BRIEF DESCRIPTION OF THE DRAWINGS

A more complete understanding of the invention and many of the attendant advantages thereof will be readily appreciated as the same become better understood by reference to the following detailed description, when considered in connection with the accompanying drawing wherein.

DESCRIPTION OF THE PREFERRED EMBODIMENT

Figure 1:
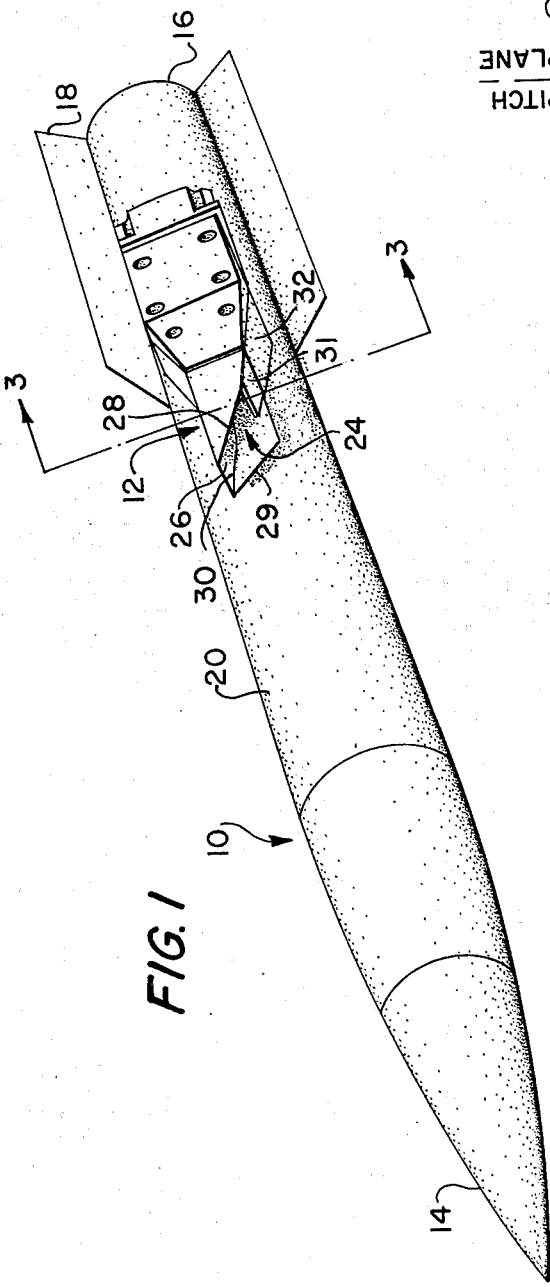
FIG. 1 is a perspective view, of the missile and one of the dual side-mounted ramjet inlets.

Referring now to the drawings, wherein like reference numerals designate corresponding parts throughout the several views, there is shown generally in FIG. 1, a missile 10, having dual, side-mounted inlets 12, (one shown) mounted near the aft end of the missile. The missile has a sharp ogive nose cone 14 suitable for speeds above mach 1. At the aft end of the missile 10 is a jet nozzle 16 which may be a conventional single or multiple port, and maybe gimballed for control of the missile's flight path. A plurality of spin stabilizing fins 18 may be attached to the body 20 at the aft end.

Figure 2:
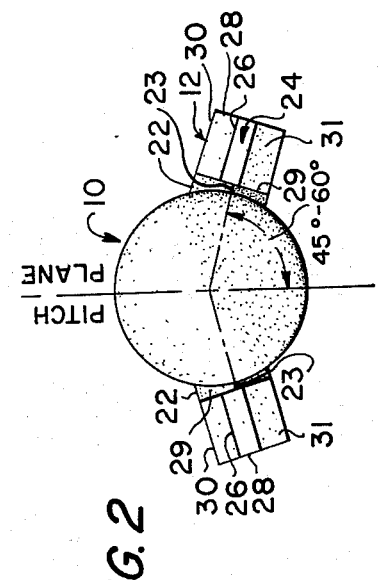
FIG. 2 is an axial front-end-on schematic view of the missile showing the nose, the splitter plates and the inlets.

Referring now to FIG. 2, an axial front-end-on schematic view of the missile is shown from ogive nose surface 14 down to the boundary layer splitter plates 22. The splitter plates have sharp leading edges 23, and are shown separating the inlets 12 from the missile body 20. The open throats of the inlets 12 are shown generally by arrows at 24.

Figure 3:
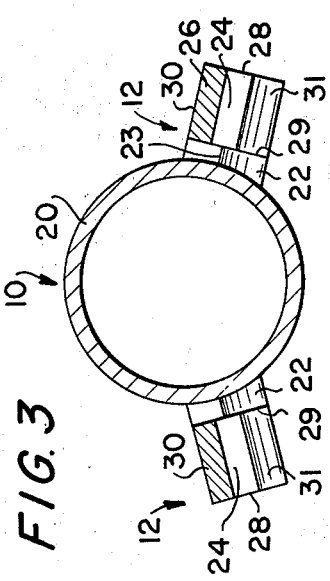
FIG. 3 is a transverse cross-section through the missile axis and through the forward end of the side-mounted inlets.

Referring now to FIG. 3 a traverse cross-section through the forward end of the ramjet inlets is shown giving greater detail of the inlet structure 12. To assure proper flow of the slipstream over the body 20 of the missile around the dual side-mounted ramjet inlets 12, there are boundary layer splitter plates 22. These splitter plates or diverters 22 have a sharp leading edge 23 and mount the entrance of the inlets at a standoff distance from the skin of the missile 10. It is seen in FIGS. 2 and 3, that the circumferential position of each of the dual side-mounted inlets is in the general vicinity of 45°–60° from the windward side meridian lying in the pitch plane at the lower side of the missile while in stabilized flight. This places the inlets on the windward side of the missile, because in flight there is always some sink due to gravity along the trajectory.

Referring particularly to the ramjet inlet 12 shown best in the FIG. 3 cross-section, the inlet throat 24 is constricted or contracted with a compression ramp 26 at the top which compresses the ram air for combustion. As shown in FIGS. 1 and 2, and best shown in FIG. 3 the compression ramp 26 extends radially across the throat shown generally at 24. An inwardly directed passage (not shown) conducts the ram air into a combustion chamber (not shown) positioned just forward of the jet nozzle 16, where fuel is injected and burned to produce a reaction jet. The leading edge of the inlet 12, comprises a cowl lip 28 on the outer-most side which is chamfered in a downward direction to accomodate ram air at relatively high angles-of-attack. The innermost side 29, closest to the missile skin is merely cutback at an angle toward the bottom to a sharp corner as shown in FIG. 1. The top 30 of the inlet 12 is chamfered back from the inner-most side 29 to outer-most side 28, but is obviously difficult to show. The outermost side 28 is chamfered back at a sharp angle as shown. Into the throat 24 from the top edge 30, there is the ramp 26, which is shown in FIG. 3 as a thick section because of where the inlet was cut for the cross-section. The bottom of the inlet 12 is bounded from side 28 to side 29 by a flap 31 which may be attached at its aft edge 32 by a hinge (not shown) for adjustability, if desired. The foregoing constitutes the boundaries and shapes of the inlet 24, as well as the inlet placement on the missile body 20.

While the operation of the missile having dual side-mounted ram air inlets may be understood from the foregoing, this type of missile requires a flight guidance system with coordinated roll-turn capabilities in order to maintain a fixed pitch plane orientation. This type of guidance maintains the dual side-mounted inlets on the bottom or windward side during flight so as to maintain superior performance at large angles-of-attack.

Obviously, many modifications and variations of the present invention are possible in light of the above teachings. It is therefore to be understood that within the scope of the appended claims, the invention may be practiced otherwise than as specifically described.

What is claimed is:
1. An airbreathing ramjet missile including:
   a pair of side-mounted ram air inlets mounted on the side of the missile near the aft end, and each circumferentially positioned from the windward side meridian by an angle less than 90°;
   standoff mounting means including sharp leading edge boundary layer splitter plates between said inlets and said missile; and
   a cowl lip on each of said inlets chamfered back toward the outside at the top and downward on the outer-most side wall toward the windward pitch plane meridian.
2. The airbreathing ramjet missile of claim 1 wherein said ram air inlets further comprise:
   a compression ramp that extends through the throat of said inlet and downstream of said cowl lip.
3. The airbreathing ramjet missile of claim 2 wherein the circumferential position of said ram air inlets is an angle of between 45° and 60° from the pitch plane meridian.

* * * * *